US008894473B2

(12) United States Patent
Bächtle (10) Patent No.: US 8,894,473 B2
(45) Date of Patent: Nov. 25, 2014

(54) METHOD AND APPARATUS FOR SUSPENDING SAUSAGES

(71) Applicant: Albert Handtmann Maschinenfabrik GmbH & Co. KG, Biberach (DE)

(72) Inventor: Manfred Bächtle, Schemmerhofen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 13/863,455

(22) Filed: Apr. 16, 2013

(65) Prior Publication Data
US 2013/0280996 A1 Oct. 24, 2013

(30) Foreign Application Priority Data
Apr. 18, 2012 (EP) .................................... 12164615

(51) Int. Cl.
| A22C 11/00 | (2006.01) |
| A22C 15/00 | (2006.01) |
| B65G 35/06 | (2006.01) |
| B65G 47/61 | (2006.01) |
| B65G 65/00 | (2006.01) |
| B65G 54/02 | (2006.01) |

(52) U.S. Cl.
CPC ....... *A22C 11/008* (2013.01); *B65G 2201/0202* (2013.01); *B65G 35/06* (2013.01); *B65G 47/61* (2013.01); *B65G 65/00* (2013.01); *B65G 54/02* (2013.01); *A22C 15/001* (2013.01)

USPC ................................................ 452/51

(58) Field of Classification Search
USPC .................. 452/30–32, 35–37, 46–48, 51; 198/678.1, 680, 682, 683
See application file for complete search history.

(56) References Cited

U.S. PATENT DOCUMENTS

| 5,100,364 | A  * | 3/1992  | Kollross et al. ............... 452/185 |
| 8,342,318 | B2 * | 1/2013  | Knodel ......................... 198/683 |
| 8,708,783 | B2 * | 4/2014  | Tamaki ........................... 452/51 |
| 2010/0243409 | A1 | 9/2010 | Borkiewicz et al. |
| 2011/0130082 | A1 * | 6/2011 | Knodel ............................ 452/51 |
| 2013/0280996 | A1 * | 10/2013 | Bachtle .......................... 452/51 |
| 2014/0073231 | A1 * | 3/2014 | Fischer et al. .................. 452/51 |

FOREIGN PATENT DOCUMENTS

| EP | 0422330 A1 | 4/1991 |
| WO | WO-0025592 A1 | 5/2000 |

OTHER PUBLICATIONS

Search Report for EP 12 16 4615, dated Dec. 3, 2012.

* cited by examiner

*Primary Examiner* — Richard Price, Jr.
(74) *Attorney, Agent, or Firm* — Marshall, Gerstein & Borun LLP (57) ABSTRACT

A method and an apparatus for suspending sausages, where sausages are taken up by suspension hooks moving on a circulation path and are conveyed, suspended from the suspension hooks, in a conveying direction into a removal area. At least a part of the suspension hooks is controllable independently of one another.

16 Claims, 9 Drawing Sheets

METHOD AND APPARATUS FOR SUSPENDING SAUSAGES

CROSS-REFERENCE TO RELATED APPLICATION

The present application claims the benefit of priority of European Application No. 12 164 615.2, filed Apr. 18, 2012. The entire text of the priority application is incorporated herein by reference in its entirety.

FIELD OF THE DISCLOSURE

The present disclosure relates to a method and an apparatus for suspending sausages for sausage production operations.

BACKGROUND

Figure 8A:
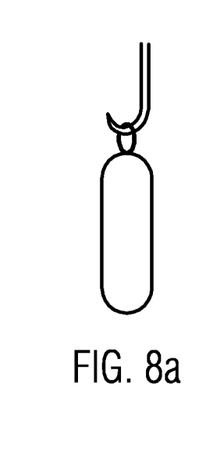
FIG. 8a, b, c show possible sausage suspension embodiments.
Figure 8B:
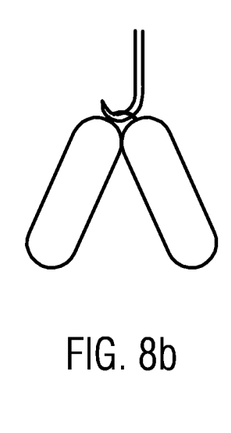
Figure 8C:
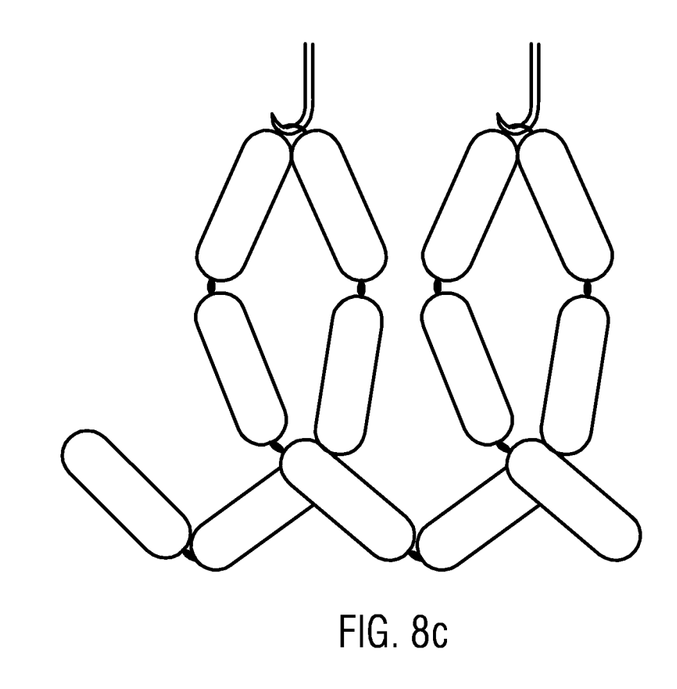

In sausage production processes the products are produced e.g. as a continuous sausage chain (individual sausages in series which are interconnected at the respective twist-off points), the sausage chains being transferred to a suspension apparatus after having been stuffed and twisted off. There, they are taken up in the form of loops by suspension hooks (cf. e.g. FIG. 8*c*). It is, however, also possible to form a loop on the individual sausage portions by means of a loop former, the formed loop being then used for suspending one or a plurality of sausages from suspension hooks of a suspender (FIG. 8*a*). Finally, also two or more sausages may be suspended from a hook at a point of division between two portions (FIG. 8*b*). The suspension hooks are mounted on the suspension apparatus such that they circulate thereon, as can especially be seen from FIGS. 9 and 10. The distances between the suspension hooks are mechanically adjustable, either stepwise (e.g. in a 5 mm raster) or continuously, and can thus be adapted to different requirements such as diameter of the sausages, number of sausages per smoke bar etc. The sausages are conveyed with the suspension hooks into one or a plurality of removal areas, the sausages being then removed e.g. by means of a smoke bar.

Figure 9A:
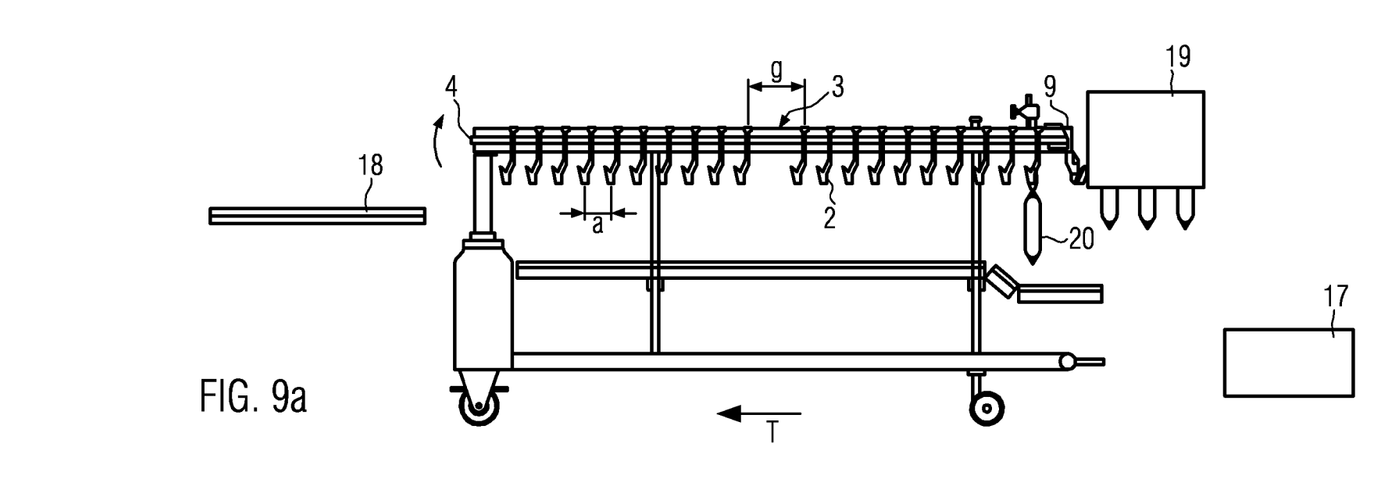
FIG. 9a shows a prior art suspension apparatus with a plurality of groups.
Figure 9B:
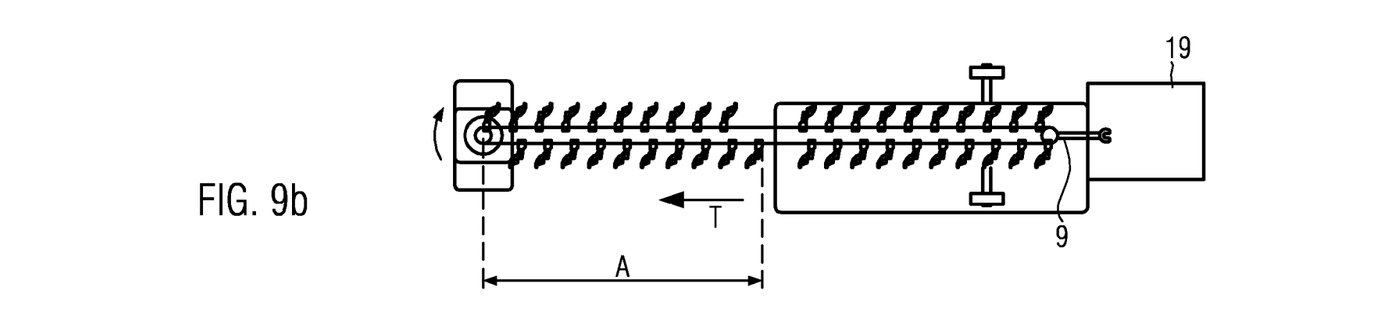
Figure 10:
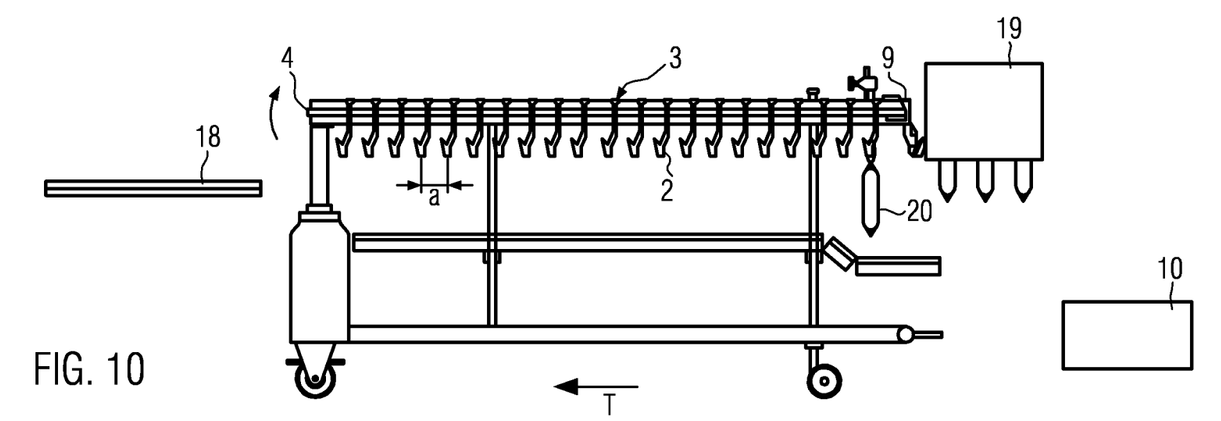
FIG. 10 shows a side view of a prior art suspension apparatus uniformly charged with hooks along the belt length.

There are different variants of charging the suspension apparatus with hooks. The length of the sausage casing used may e.g. be adapted such that the sausage chain produced fits precisely onto a smoke bar. In these cases it will also make sense to charge the suspension apparatus in groups, one group comprising the number of hooks corresponding approximately to one smoke bar length, e.g. 4 groups comprising each 20 hooks. FIG. 9*a* and *b* show, in a simplified representation, 4 groups comprising each 10 hooks.

If sausage casings are used whose length is not adapted to the smoke bar length, the suspension apparatus will normally be charged with hooks over its whole length. This kind of charging is primarily used in the processing of natural sausage casings. The suspension apparatus is here fully charged and all hooks are normally spaced apart at identical distances, as is especially also shown in FIG. 10.

Prior to removing the sausage loops, the operator will have to cut the strand at the right point and he may also have to close the ends (by knotting, fastening with clips, welding). It may be difficult to rapidly find the right point for such closing. This also applies to the predetermined distance between the hooks. In the production process, one hook may, as a supporting measure, travel beyond the transfer position, i.e. it may not have attached thereto a sausage, so that a gap is created. Alternatively, also hooks having different colors are used for marking the end of the group. Both kinds of supporting measures are, however, disadvantageous in so far as they are not flexible.

When products having a different caliber are stuffed, it may happen that the distances which the individual suspension hooks have relative to one another must be adjusted. To this end, a complicated changeover process is necessary. This means that at least part of the suspension hooks must be removed and placed onto the hook conveying element at the desired distances. The hook conveying element (toothed belt or chain) of the suspension apparatus has a fixed circumference (e.g. 4,000 mm). If e.g. 120 hooks were to be positioned at respective identical distances from one another, the distance would be 33.33 mm. If a distance of 40 mm is required, 20 hooks will have to be removed before the distance can be adjusted. These changeover and setting operations are very time-consuming.

Therefore, all the prior commercially available suspension apparatuses fail to offer the possibility of changing them over rapidly and easily so that other demands can be fulfilled.

SUMMARY OF THE DISCLOSURE

Starting from the above, it is one aspect of the present disclosure to provide a method of suspending sausages and a suspension apparatus, which allow the distances between the suspension hooks to be adjusted easily and individually.

According to the present disclosure, at least a part of the suspension hooks can be controlled independently of one another by a control unit. The suspension hooks can thus be driven separately and individuality independently of the rest of the suspension hooks. A previously defined number of suspension hooks is arranged. The desired distances between the suspension hooks can then be adjusted by the movement of the individual suspension hooks relative to one another, without any complicated retooling being necessary. Therefore, the suspension hooks need no longer be uniformly distributed over the circumference of the apparatus in a defined manner, as has been necessary in the case of prior commercially available suspension units. It will be of advantage when all the suspension hooks are controllable and drivable independently of one another, since this allows maximum flexibility, but it will even be of advantage when only a few suspension hooks can be driven independently, when e.g. the suspension hooks of one hook group are adapted to be driven independently of other hook groups.

The suspension hooks are therefore driven independently by a respective suitable drive.

According to an advantageous embodiment, the suspension hooks are guided on a substantially horizontal, closed circulation path. It will here be of advantage when the speed of a suspension hook varies during one cycle, the variation referred to being here a variation of the speed of movement (in addition to standstill) of the suspension hooks. The speed of the suspension hook can thus ideally be adapted e.g. to the various process steps such as taking the sausages up on the hooks, advancing them, removing the sausages by means of a smoke bar and returning the hooks to the transfer position. The process in its entirety is not delayed by the delay of one or a plurality of suspension hooks during removal, since the suspension hooks can be moved faster in areas downstream of the take-up area.

According to an advantageous embodiment, the distances between successive suspension hooks are adjusted to predetermined distances, said distances being either constant or position- and time-dependent. This means that the present disclosure allows the hooks to be spaced apart at predetermined, always constant distances from one another or to be spaced apart at different distances from one another at various locations or in various areas on the circulation path. These distances may also be varied as a function of time. In this case, e.g. the distances between successive suspension hooks may be adjusted with the aid of position detection or predetermined suspension hooks (whose starting point is known) may be advanced to desired positions at specific moments in time by adjusting the speed.

The distances between the hooks can be adjusted such that there will be a specific number k of groups, which comprise a specific number n of suspension hooks, the distance a between the suspension hooks within a group being smaller than the distance g between two groups. The sausage loops can thus be removed very easily by means of a smoke bar.

It is then also possible to vary the distances of the hooks within a group and/or to adjust and vary the distance between two groups while the suspension hooks are being conveyed. Varying the hook distances within a group offers the advantage that the distance between two neighboring hooks can be enlarged so that the product can easily be taken up by the hooks. As soon as products have been suspended from the full number n of suspension hooks of a group, the hooks within a group can be moved towards one another to such an extent that the products will just not be in contact with one another. The smoke bars are thus filled optimally and, consequently, also the plant components used for the subsequent process steps, e.g. the smoke chambers, can be filled optimally.

In the case of endless charging, the distances of groups between the two hooks carrying e.g. the end of the first and the beginning of the second group can be adjusted and varied. This will, on the one hand, help the operator to recognize this separation point, and, on the other hand, provide additional free space for the operating staff so that the separation process can be carried out more easily (if the sausage casing strand should extend beyond a group end).

In addition, one group may be moved independently of a second group on the circulation path. When the products of a group are being removed from the hooks, the speed may thus be reduced or stopped for a certain period of time so as to supply the smoke bar (manually or automatically). Therefore, a buffering possibility is provided, which allows removal of a sausage group independently of the suspension function. In addition, it is now possible to remove the different groups in different take-up areas at different moments in time. The prior art did not offer this possibility, since when one group was standing still the respective other groups were stopped as well. The present disclosure thus allows an improved production process. As has already been described, it is particularly advantageous when the distance between two neighboring suspension hooks is controlled such that the distance is larger when the respective sausages are taken up than it is when the sausages are removed in a removal area, and/or when the speed of movement of the suspension hooks is lower when the sausages are taken up than it is in an area located downstream in the conveying direction. This allows reliable taking-up of the sausages and, simultaneously, optimal filling of the smoke bar.

The apparatus according to the present disclosure comprises a plurality of suspension hooks circulating on a circulation path and used for taking up sausages, at least a part of the suspension hooks being controllable independently of one another by means of a control unit.

At least a part of the suspension hooks is provided with a separate drive. This separate drive may be realized as follows: the suspension hooks may have a motor of their own or they may be driven via a respective separate circulating driving element such as a circulating belt or a circulating chain. The hooks may also be driven independently of one another by linear motors.

In addition to the drive, the apparatus also includes a guide means with the aid of which the hooks are guided on the circulation path. The suspension hooks are freely movable in said guide means.

The suspension apparatus further comprises a control unit, which is configured such that the suspension hooks will be spaced apart at specific distances, the predetermined distances being constant or position- and/or time-dependent. According to an advantageous embodiment, the control unit is configured such that the suspension hooks are movable with varying speed during a cycle.

According to a preferred embodiment, the apparatus includes a position detection system detecting the position of individual suspension hooks, the control unit being configured such that the suspension hooks are controlled in a position-dependent manner. The use of a position detection system allows a particularly flexible method and is in particular also suitable for the application of linear motors.

BRIEF DESCRIPTION OF THE DRAWINGS

In the following, the present disclosure will be explained in more detail making reference to the following figures:

FIG. 9b shows a top view of the prior art suspension apparatus shown in FIG. 9a.

DETAILED DESCRIPTION OF THE PREFERRED EMBODIMENT

Figure 1:
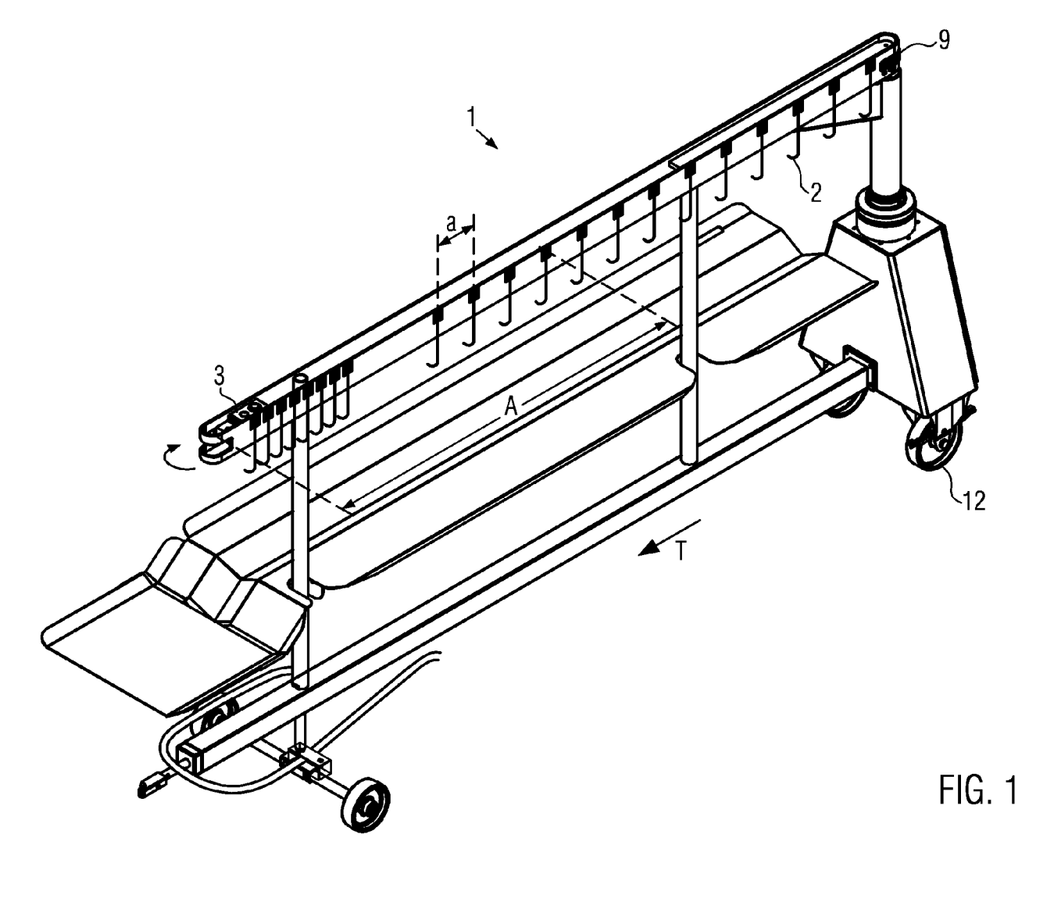
FIG. 1 shows a highly schematic perspective representation of an embodiment according to the present disclosure.

FIG. 1 shows in a highly schematic perspective view a suspension apparatus 1 according to the present disclosure.

The suspension apparatus comprises a plurality of hooks 2 circulating on a closed circulation path 3. The hooks are preferably arranged parallel to one another and the circulation path extends substantially horizontally.

The suspension hooks 2 serve to take up sausages or sausage loops in the area of a transfer position 9 and to convey them in the conveying direction T, i.e. in the direction in which the hooks circulate, into a removal area A provided. The removal area is the area in which the suspension hooks are arranged for removing therefrom the sausages, e.g. by means of a smoke bar. The sausages are suspended from the hooks in sausage loops. A sausage loop may here either be a loop 21 that has been attached to a sausage or a plurality of sausages by a loop former, see FIG. 8a, or loops defined by sausage chains provided in the form of a loop (individual sausages in series which are interconnected at respective twist-off points). It is also possible to suspend at least two sausages 20 from the hook 2 at their point of division or twist-off point.

In the front area of the suspension apparatus, a suspension hook 2 threads into the sausage loop at a transfer position 9, said sausage loop being fed by a conveyor unit 19 with a transfer device (not shown in FIG. 1, cf. e.g. FIG. 9a), removes the sausage loop and carries it on. Transfer and conveyor units of the type in question are known and will here not be explained in detail, consequently. The suspension apparatus shown in FIG. 1 includes wheels 12 and is therefore mobile and can be moved such that the front end thereof will precisely be located at a take-up position 9.

According to the present disclosure, the suspension hooks 2 are adapted to be controlled and driven separately and individually. Flexible distances a of the hooks 2 relative to one another can thus be adjusted without any changeover being necessary.

The independent control and drive of the suspension hooks can, as will be explained in more detail hereinbelow, either be accomplished in that the hooks have drives of their own, in the form of respective electric drive motors M1, M2, M3, or driven driving belts or driving chains 22, cf. FIGS. 2 and 4, or separate linear motor drives. In this case, linear motors 7, 14 are used which circulate along the path of the suspension hooks 2.

Figure 2:
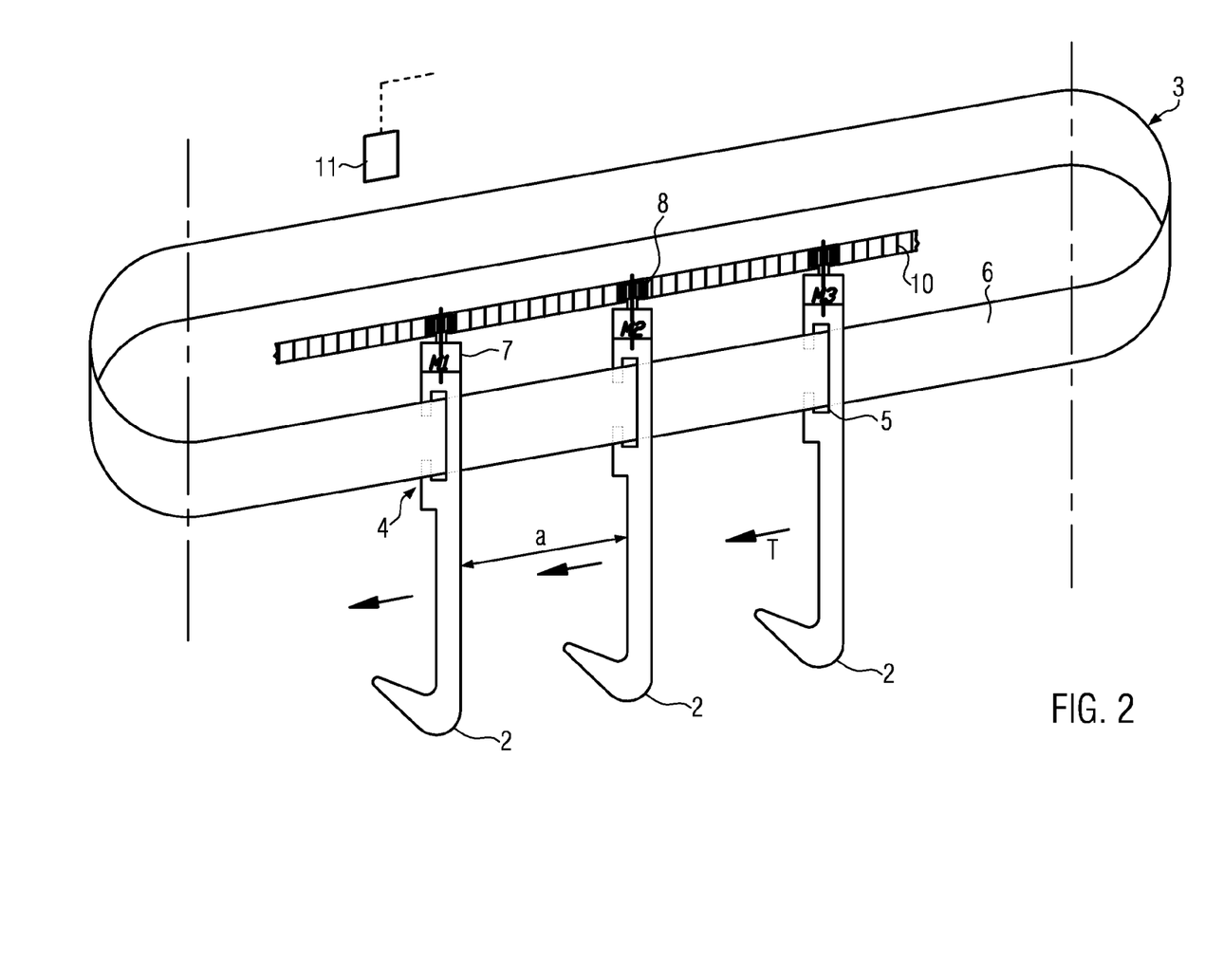
FIG. 2 shows a highly schematic perspective representation of an embodiment of the present disclosure with individual drives on the hooks.

In the embodiment shown in connection with FIG. 2, the apparatus includes e.g. a guide means 4, the hooks 2 being arranged on a circumferentially extending guide rail such that they are freely movable in the conveying direction T. In FIG. 2, the hook comprises e.g. an opening 5 through which the guide rail 6 extends. The suspension hooks 2 each have a motor 7 of their own, which drives the hooks 2. The motor 7 can move the hooks in the conveying direction T e.g. via a gear 8 and a rack 10. The rack is here shown in a simplified form and its shape is adapted to the circulation path and the guide rail, respectively, such that the hooks 2 are able to circulate. To make things easier, only three hooks 2 are here shown. The power supply of the motors can be accomplished by a sliding contact, which is here not separately shown. Also the control of the individual motors is executed via a sliding contact or e.g. via radio signals etc. The control may drive the motors 7 according to a program which is permanently stored in advance and which comprises a specific sequence of program steps, whereby specific distances a between the suspension hooks 2 can be set automatically via the movement of the hooks 2 relative to one another. The distances a, g may either be constant or not constant, the distance depending on the position of neighboring suspension hooks on the circulation path.

It is, however, also possible to use a position detection system 11, which allows the exact position of individual hooks 2 to be determined. For the present embodiment, e.g. an optical sensor would be suitable as a position detection system.

As indicated in a highly schematic fashion, the sensor 11 may be arranged at one point. The respective location of the hooks can then be determined via the speed and the reference position. Preferably, a linear measurement system is, however, used, a sensor unit being then arranged along the circulation path of the hooks. In order to recognize the position of the individual hooks, the latter may be marked or coded in a suitable way.

Figure 5:
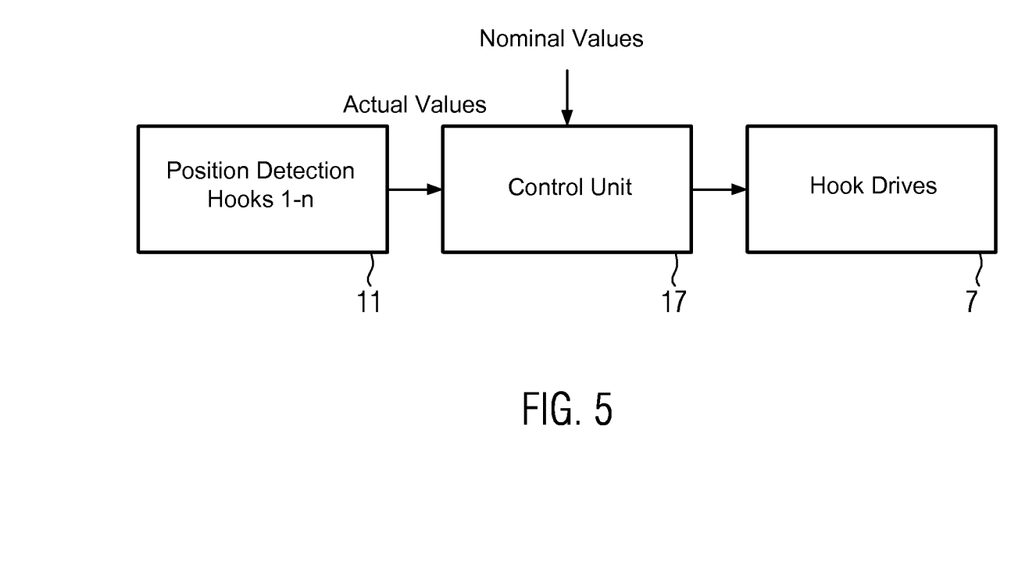
FIG. 5 shows schematically a control principle according to the present disclosure.

As can be seen from FIG. 5, parameters, e.g. nominal values for the distance a between successive suspension hooks, can be entered via an input unit which is not separately shown, in particular for specific areas on the circulation path and/or for specific moments in time (the moment in time being a moment at which a suspension hook driven with a known speed is present at a specific point after having passed a specific location at a reference moment—this moment in time then corresponds to a specific position).

The position detection system 11 detects the position of the respective hooks 1 to n (n E IN) and transmits the position values to the control unit 17. The control unit 17 then compares e.g. the actual value and the nominal value and transmits control signals to the individual hook drives 7, which will then move the hooks 2 to the correct position.

Figure 3:
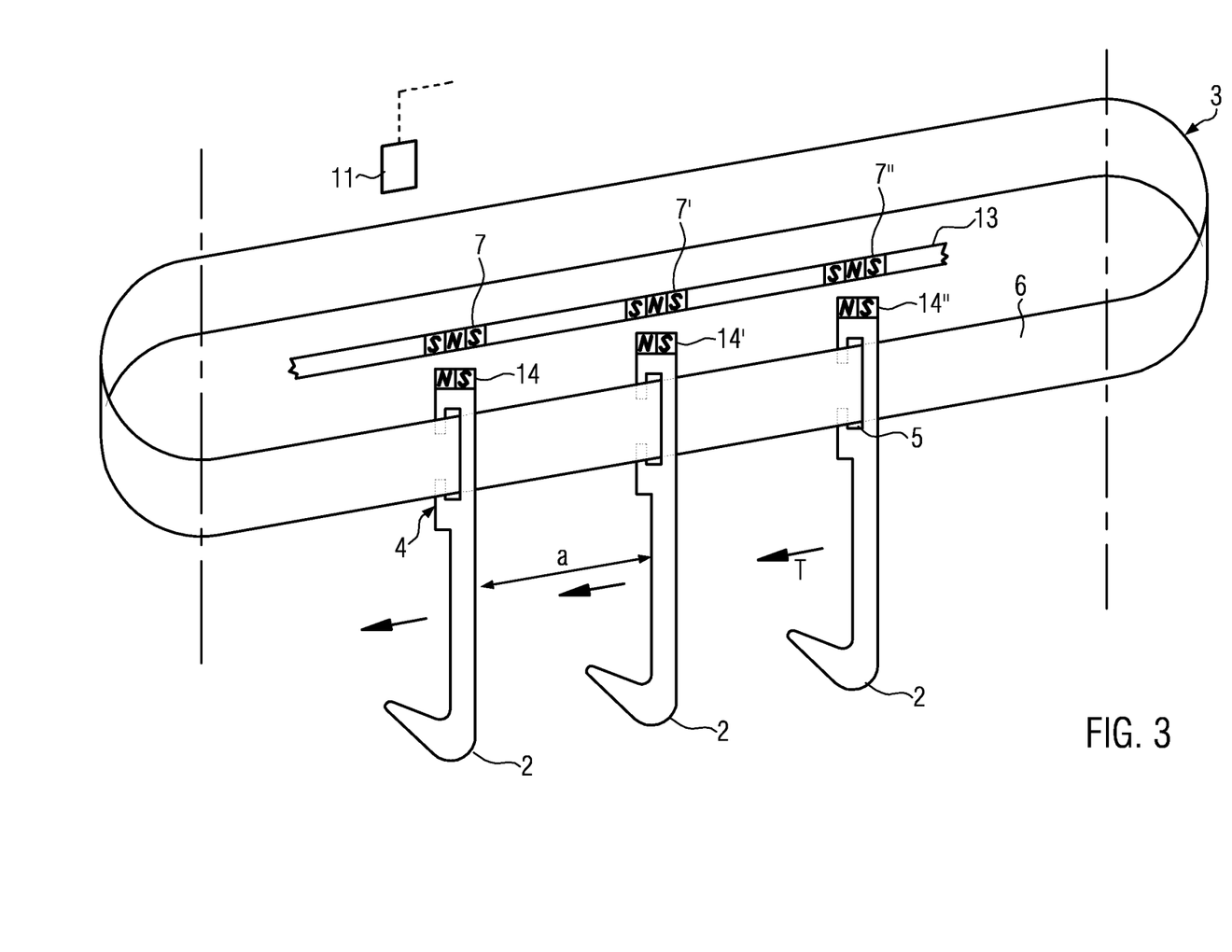
FIG. 3 shows a highly schematic perspective representation of a further embodiment including a linear motor.

FIG. 3 shows a further possible embodiment according to the present disclosure. For the sake of simplicity, also this figure only shows three hooks 2. This embodiment corresponds to the embodiment shown in FIG. 2, but the individual motors are here replaced by linear motors 7, 7', 7", which are arranged in spaced relationship with one another along the whole path of the hooks 2. (To make things easier, only three linear motors are shown here). The suspension hooks 2 are provided with permanent magnets 14, 14', 14" as runners of the linear motors 7, 7', 7", the orientation of the magnets being the same in the case of all suspension hooks, here e.g. north pole at the front. The respective permanent magnets 14 and a respective linear motor then represent a drive in common. The position of each individual suspension hook on the circulation path is transmitted to the control unit 17 by means of a position detection system 11. A system suitable for use as a position detection system is e.g. an optical or magnetic position detection system, in particular an integrated absolute multi-position system, with the aid of which the exact position of each individual hook can be determined at any time.

Preferably, also a linear measurement system is used in this case, the sensor unit extending along the circulation path of the hooks so as to determine the exact position of the hooks. The individual hooks are here again suitably marked or coded so as to determine their exact position.

As has already been explained in connection with FIG. 2, the position signals are transmitted to the control unit 17 and compared with respective nominal values. As a result, the circulatorily arranged linear motors 7, 7', 7" are controlled such that e.g. the electromagnet upstream of the hook 2 attracts, as south pole, the north pole of the hook, whereas the south pole of the hook is simultaneously repelled by the south pole of the downstream stator south pole. The pitch of the magnets on the hook must be different from the pitch of the stator magnets. The movement of the hook caused by these magnetic forces is, in turn, recognized by the position detection system 11, and the linear motors, which are located downstream in the conveying direction, are controlled accordingly. This means that, depending on the position of a specific hook, the coils of the linear motors 7, 7', 7" are controlled with appropriate nominal current values. As has been described above, it is thus possible to adjust the distance a, g between successive hooks through the movement of said successive hooks relative to one another.

Figure 4:
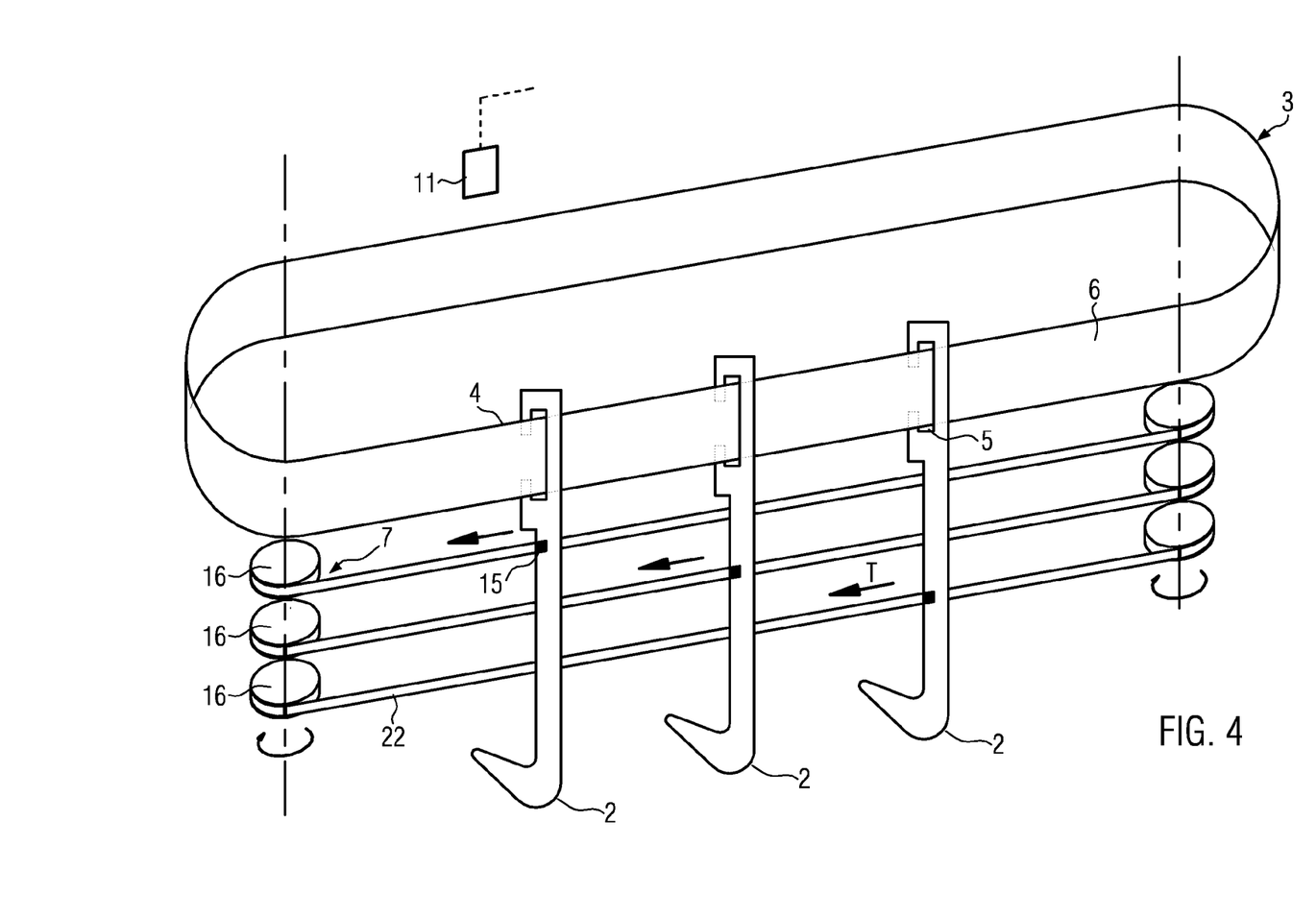
FIG. 4 shows a highly schematic perspective representation of an embodiment of the present disclosure comprising individual circulating driving elements.

According to another possible embodiment, the individual hooks 2 are, as shown in FIG. 4, driven via separate circulating drive belts 22. As for the rest, the embodiment shown in FIG. 4 corresponds to the embodiments shown in FIGS. 2 and 3. The belts 22 are circulatorily driven via driving rollers 16 and are connected to a respective hook via a coupling 15. Hence, the individual hooks 2 can again be driven and controlled independently of one another. The position detection system shown in connection with FIGS. 2 and 3 can also be used in this case.

In the following, a plurality of possibilities of executing the method according to the present disclosure will be explained in more detail.

When the method according to the present disclosure is being executed, the apparatus is equipped with a specific number n of suspension hooks 2. For a specific case of use, e.g. for a specific sausage caliber and a specific length of a smoke bar 18, appropriate parameters are inputted in the control unit 17 as nominal values prior to the actual process. In so doing, e.g. the distance a, g (or respective values such as sausage caliber and smoke bar length) between two subsequent hooks 2 is inputted. Also position- and/or time-dependent distances a, g may be inputted. Likewise, specific speeds for the hooks in specific areas or at specific locations may be inputted.

Figure 6:
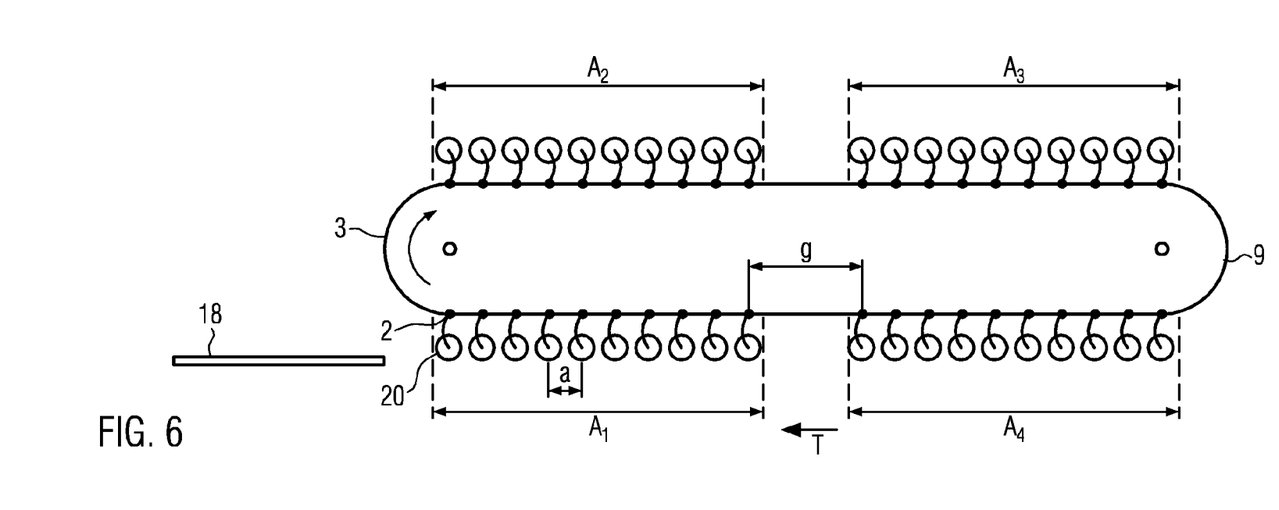
FIG. 6 shows a highly schematic top view of an embodiment of the present disclosure with a plurality of groups.

As can be seen in FIG. 6, the distances between the hooks can be adjusted such that a specific number k of groups (in FIG. 6 four groups) is defined (k E IN), said groups comprising a specific number n of suspension hooks 2. The individual groups are spaced apart at a distance g, i.e. the last hook of an upstream group is positioned at a distance g from the first hook of a subsequent group. The suspension apparatus 1 may also comprise a plurality of removal areas A1, A2, A3, A4, the sausages being removed e.g. by means of a smoke bar 18 in these areas. To this end, a smoke bar 18 or a smoke bar insert may be introduced in the loops or between the sausages, and the sausages can then be removed from the hooks, e.g. by raising the smoke bar 18. The suspension hooks 2 of one group can be moved independently of the suspension hooks of another group, they may e.g. be stopped so as to remove the sausages.

Figure 7:
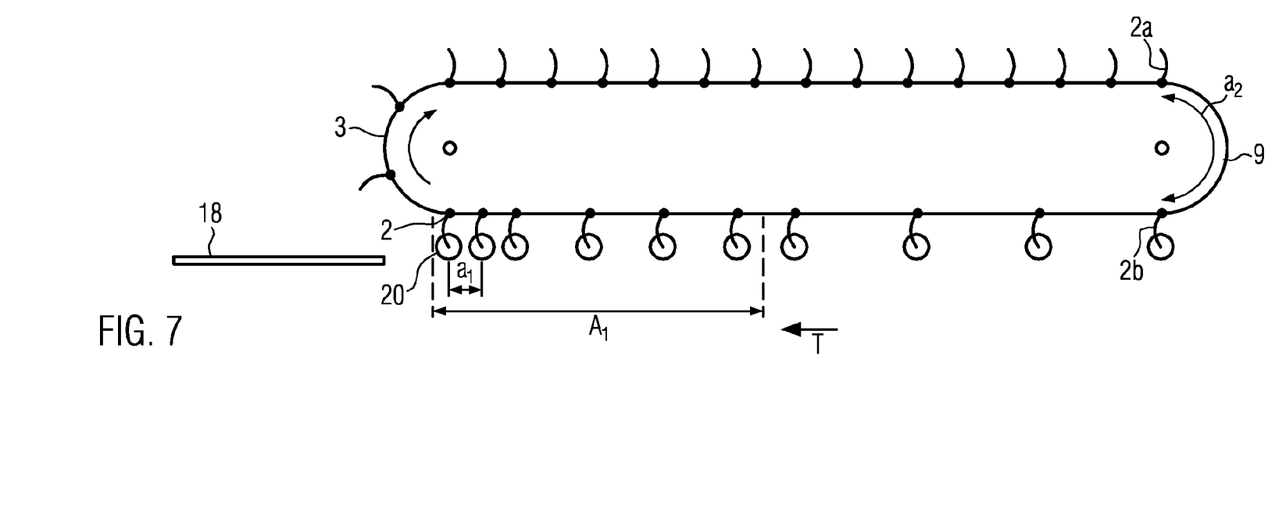
FIG. 7 shows a highly schematic top view of an embodiment according to the present disclosure with suspension hooks spaced apart at varying distances.

FIG. 7 shows a possible embodiment for the method according to the present disclosure. In this figure, only one removal area A is shown, in which the sausages can be removed upwards, e.g. by a smoke bar 18. Likewise, a plurality of removal areas may, however, be provided, e.g. also on the back of the apparatus.

As described above, specific distances a and g are predetermined for a specific sausage caliber. A suspension hook 2*a* moves towards the transfer position 9 and threads into a sausage loop so as to take up and remove said loop from a holder, where it was arranged before. In this region, it will be of advantage when the suspension hook 2*a* enters the area of the transfer position 9 at a lower speed—in comparison with a speed at which e.g. suspension hooks are advanced in an area following the transfer position. According to an advantageous embodiment, the distance between two neighboring hooks 2*a* and 2*b* may be enlarged so that the products can be taken up more easily by the suspension hooks, i.e. the distance a2 between the hooks (the distance a2 is considered to be the path length between the suspension hooks 2*a,b*) is larger upstream and downstream of the transfer position 9 than e.g. the distance a1 at which the suspension hooks 2 will then be spaced apart in a removal area A, when the products are being removed therefrom in said area. As soon as the complete group intended for the removal area A has been suspended from the suspension hooks, the suspension hooks can, as shown in FIG. 7, be moved towards one another within a group to such an extent that the products will just not be in contact with one another, i.e. be spaced apart at the distance a1. When the smoke bar 18 is being inserted and raised, the suspension hooks of a group may also be stopped. As soon as the sausages have been removed from the removal area A, the suspension hooks of this group are returned towards the transfer position 9 on the circulation path. In so doing, the suspension hooks may again be moved at a speed that is higher than the speed in the area of the transfer position 9.

The embodiment shown in FIG. 7 has been described with only one group A. However, the sausages may first be suspended from the number of suspension hooks of one group, as has also been described in connection with FIG. 6, and moved into closely spaced relationship with one another in a respective removal area on the side shown as rear side in FIG. 7, where they are finally removed. While the hooks of the first group are being conveyed into the removal area (e.g. A3), the sausages of the subsequent group may already be taken up on hooks. It is then possible that, while a first group is already being removed (with the suspension hooks standing still, by way of example), sausages of a subsequent group or of subsequent groups are suspended or conveyed into the subsequent removal areas (A2, A1, A4).

The method according to the present disclosure is well suited for group charging, where the length of the sausage casing used is adjusted such that the sausages produced will fit onto a smoke bar. The method is just as well suited for endless charging, i.e. a production mode in which the length of the sausage casing is not adapted to the smoke bar length. In any case, a sufficient distance g between the groups can be adjusted, so that the smoke bar can easily be threaded-in and the end of the group can easily be recognized.

The present disclosure allows a large number of method variants, and the respective method can be adapted individually to the particular circumstances such as sausage caliber, process speed, length of the smoke bar, etc. It is only of importance that the suspension hooks are able to move on a circulation path independently of one another.

The invention claimed is:

1. A method for suspending sausages, comprising taking up sausages on suspension hooks circulating on a circulation path and conveying them, suspended from the suspension hooks, in a conveying direction into a removal area, and all of the suspension hooks being controlled independently of one another.

2. The method according to claim 1, and all of the suspension hooks being driven independently of one another.

3. The method according to claim 1, and the suspension hooks are guided on a substantially horizontal circulation path.

4. The method according to claim 1, and the speed of the suspension hooks varies during a cycle on the circulation path.

5. The method according to claim 1, and the adjusting the distances (a, g) between successive suspension hooks to predetermined distances (a, g), the distances (a, g) being constant or depending on the position of the suspension hooks and/or on time.

6. The method according to claim 1, wherein the distances a between the suspension hooks are adjusted such that there will be a specific number k of groups, which, in turn, comprise a specific number n of suspension hooks, the distance a between the suspension hooks within a group being smaller than the distance g between the respective groups.

7. The method according to claim 1, wherein, while the suspension hooks are being conveyed, the distances (a) of the suspension hooks within a group are varied and/or the distance (g) between two groups is varied.

8. The method according to claim 1, wherein the suspension hooks of one group are moved independently of a second group.

9. The method according to claim 1, wherein the distance (a) between two neighboring suspension hooks is controlled such that the distance (a2) between a first suspension hook and the suspension hook positioned ahead of the first suspension hook is larger when the respective sausages are taken up on a suspension hook than it is when the sausages are removed in a removal area located downstream in the conveying direction and/or that the speed of movement of the suspension hooks is lower when the sausages are taken up than it is in an area located downstream in the conveying direction.

10. A suspension apparatus for carrying out the method according to claim 1, comprising suspension hooks circulating on a circulation path and used for taking up sausages, and with all of the suspension hooks being controllable independently of one another.

11. The suspension apparatus according to claim 10, wherein at least a part of the suspension hooks is provided with a separate drive.

12. The suspension apparatus according to claim 10, wherein at least a part of the suspension hooks includes, as a drive, a motor of its own or a circulating driving element of its own or that at least two of the suspension hooks are driven independently of one another by means of linear motors.

13. The suspension apparatus according to claim 10, wherein the suspension apparatus comprises a control unit, which controls the suspension hooks such that successive suspension hooks are spaced apart at specific distances (a, g).

14. The suspension apparatus according to claim 10, wherein the control unit is configured such that the suspension hooks are movable with varying speed during a cycle.

15. The suspension apparatus according to claim 10, wherein the apparatus includes a position detection system, which is able to detect the position of the suspension hooks, the control unit being configured such that the suspension hooks are controlled depending on the position detected.

16. The suspension apparatus according to claim 10, wherein the apparatus includes an input unit through which in particular parameters for distances between successive hooks can be inputted.

* * * * *